INVENTOR.
WILLIAM A. RAY
By Gordon H. Olson
ATTORNEY.

United States Patent Office 3,393,508
Patented July 23, 1968

3,393,508
HYDRAULIC ACTUATOR HAVING POSITION RESPONSIVE RELIEF VALVE MEANS
William Alton Ray, North Hollywood, Calif., assignor to International Telephone and Telegraph Corporation, a corporation of Delaware
Filed Sept. 26, 1966, Ser. No. 582,136
9 Claims. (Cl. 60—52)

This invention relates to hydraulic actuator apparatus and more particularly to an improved system for controlling the hydraulic fluid applied to an actuator piston, which may be employed to control a valve, damper, or other device.

In a copending patent application by William A. Ray, filed Jan. 12, 1966, Ser. No. 520,154, assigned to the same assignee as the present invention, there is disclosed a fluid control system for a hydraulic actuator in which the fluid pressure output from a pump utilized to move an actuator piston is bled at a controlled rate to determine the position of the actuator piston, and in which there is provided a minimum flow valve in the control pressure line to insure that no fluid is bled from the control line until the actuator piston, and hence the device controlled by the piston, has moved a certain minimum amount. Such an arrangement prevents control pressure from being dissipated or bled from the system until the predetermined minimum amount of motion has occurred.

It has been found that for certain applications of hydraulic apparatus of this nature, such as in the control of gas valves, that in order to meet certain safety codes and standards, it is necessary that the actuator piston move extremely fast to such a minimum flow position of the valve. Such requirement is intended to minimize the release of fuel gas prior to combustion.

Accordingly, it is a primary object of this invention to provide a fluid control system for a hydraulically operated actuator piston in which the piston will be opened to a predetermined minimum amount at an extremely rapid rate.

It is another object of this invention to provide such a system in which a relatively large quantity of hydraulic pressurized fluid is furnished to move quickly an actuator piston a minimum amount, and after which the flow rate is considerably decreased so that available, low volume proportioning control equipment may be employed to maintain the actuator piston at desired positions.

Yet another object of the invention is to provide such a control system which is relatively inexpensive and highly reliable.

Briefly stated, the invention includes a source such as an electric motor driving a pair of pump units which furnish pressurized fluid at a high rate to an actuator piston utilized to control the positioning of a gas valve or similar device. Means are provided to bleed fluid from the control line after the piston has moved a minimum amount to thus maintain the piston at desired settings, and a minimum flow valve operated by the piston is positioned in the control pressure line to insure that no pressure is bled from the line until after the piston has moved the minimum amount. Once the piston has moved the minimum amount, the high volume output obtained from having two pump units is no longer needed to maintain the piston in its desired position and the low cost bleed means which is employed is not designed to handle the high volume output of dual pump units. Therefore, there is provided a relief valve operated by the pressure in the line downstream from the minimum flow valve. The relief valve is connected to one of the pump units to bypass the entire output of that pump unit when the valve is open with the result that the actuator piston is thereafter controlled simply by the other pump unit. Thus, it can be seen that the additional pump unit and the relief valve insure quick movement of the actuator for such minimum amount.

Further features, objects and advantages will become apparent with reference to the following description and drawings in which FIG. 1 is a diagrammatic illustration of the control system of the invention;

Figure 1:
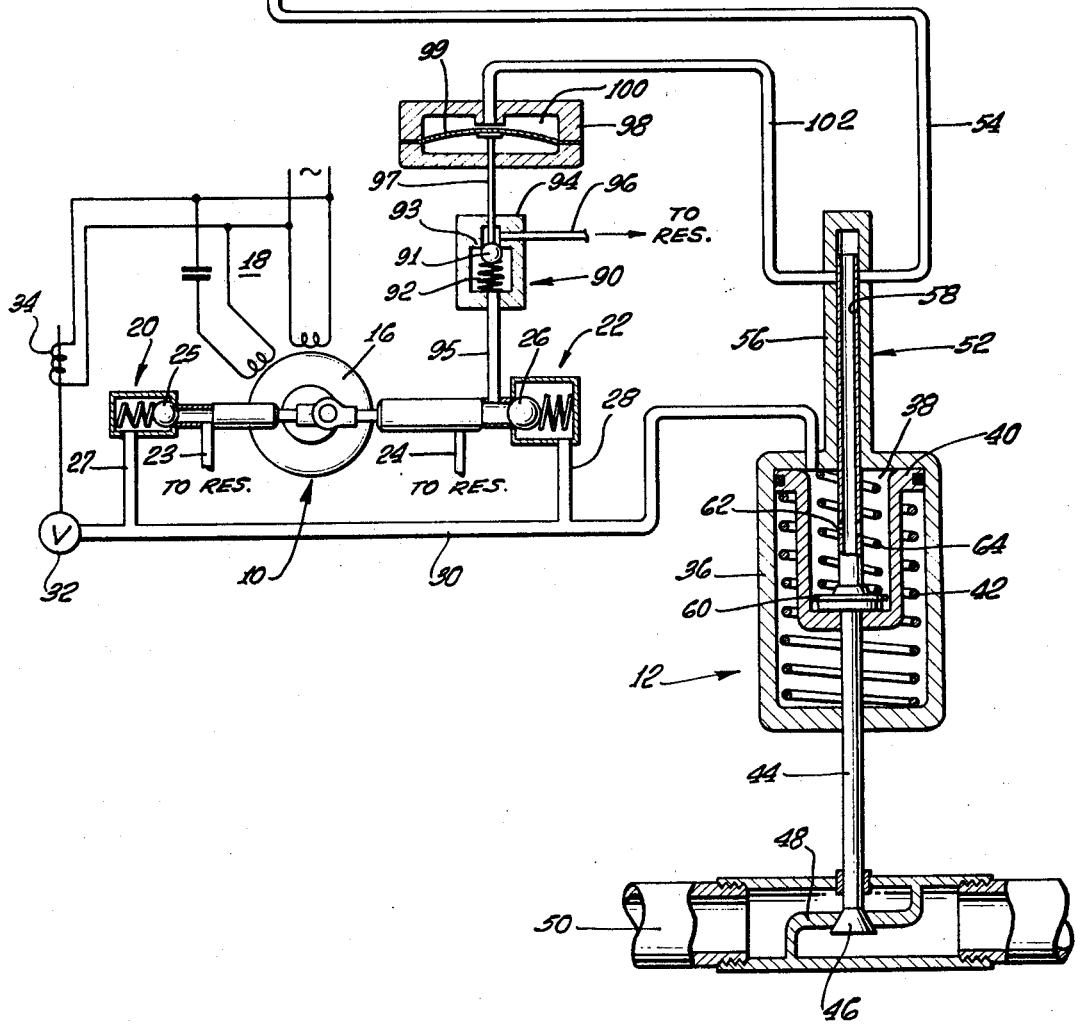

Referring now to FIG. 1, the control system shown therein includes a pressure source 10 operating an actuator mechanism 12 and controlled by pressure bleed mechanism 14. The pressure source is shown by way of illustration as an electric motor 16 driven by suitable electrical means 18 and driving a pair of piston and cylinder pump units 20 and 22. Pump unit 20 has an inlet line 23 connected to a reservoir of hydraulic fluid, an outlet valve 25 and an outlet line 27 connected to a conduit 30 leading to the actuator mechanism 12. Pump unit 22 has similar components 24, 26, and 28. It should be understood that various pumping mechanisms may be provided but that the preferred approach is to utilize a single electric motor driving two pistons from a single shaft with the piston forming positive displacement type pumps which alternately provide a pulse of pressurized fluid. As a safety feature, there is included a valve 32 operated by suitable electromagnetic means 34 incorporated with the motor drive means 18. The safety valve 32 is connected to be opened when the electromagnetic means 34 is unenergized.

Conduit 30 is connected to a cylinder 36 which opens into a chamber 38 formed by the upper surface of the piston 40 and the adjacent cylinder walls. The piston has a generally cup shape and a coil spring 42 surrounds the piston engaging an outwardly extending flange to urge the piston upwardly to the position shown in FIG. 1. A piston rod 44 attached to piston 40 extends downwardly through the lower end of cylinder 36 and is attached to a valve member 46 controlling the flow of fluid through valve seat 48 located in conduit 50. Such a valve and conduit is suitable in various applications, such as a fuel line in a large heating system. The reader will appreciate that the position of valve member 46 and actuator piston 40 is dependent on the pressure in chamber 38 as provided by the source of pressurized fluid 10 through the conduit 30.

Figure 2:
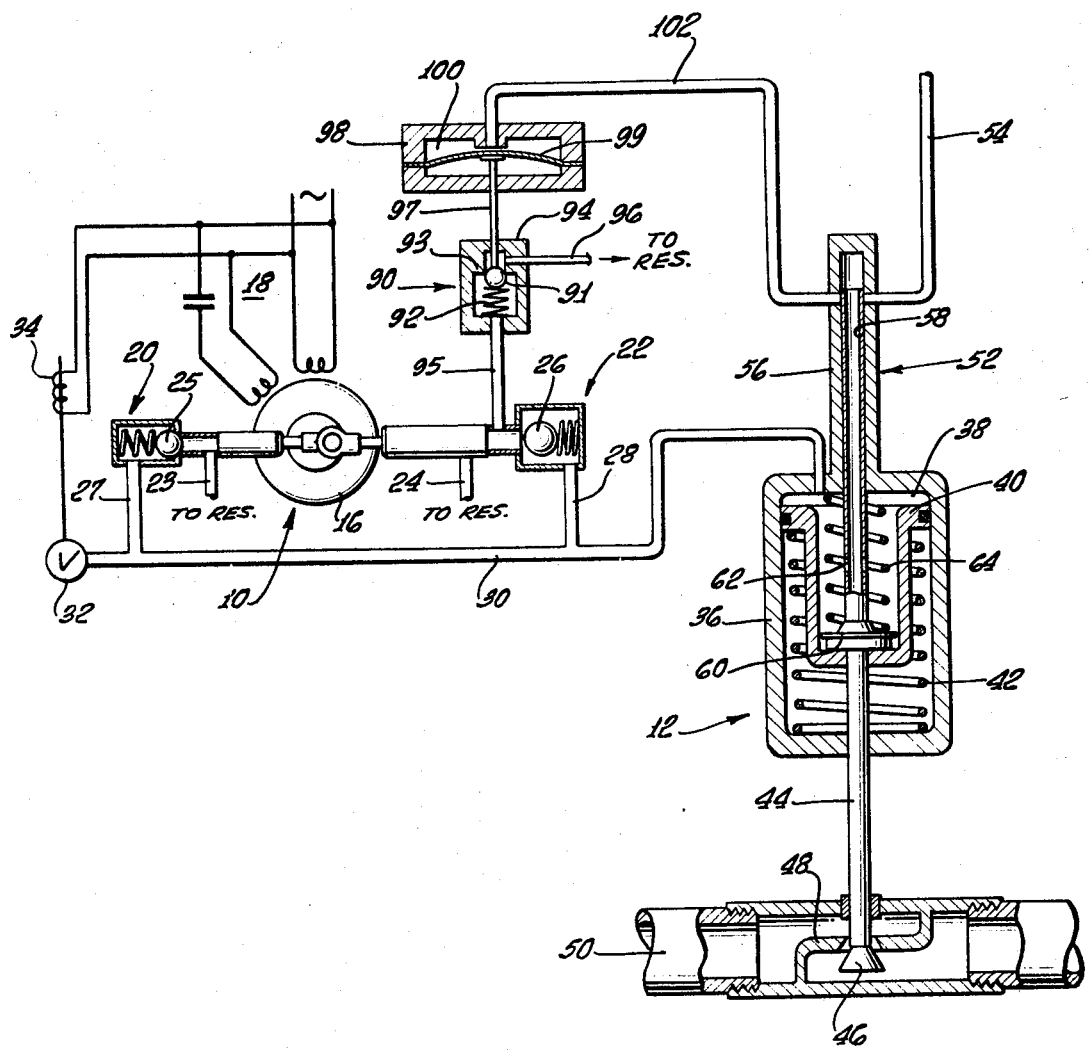
FIG. 2 shows a portion of the system of FIG. 1 after the actuator piston has moved a certain amount but before the relief valve has been opened.
Figure 3:
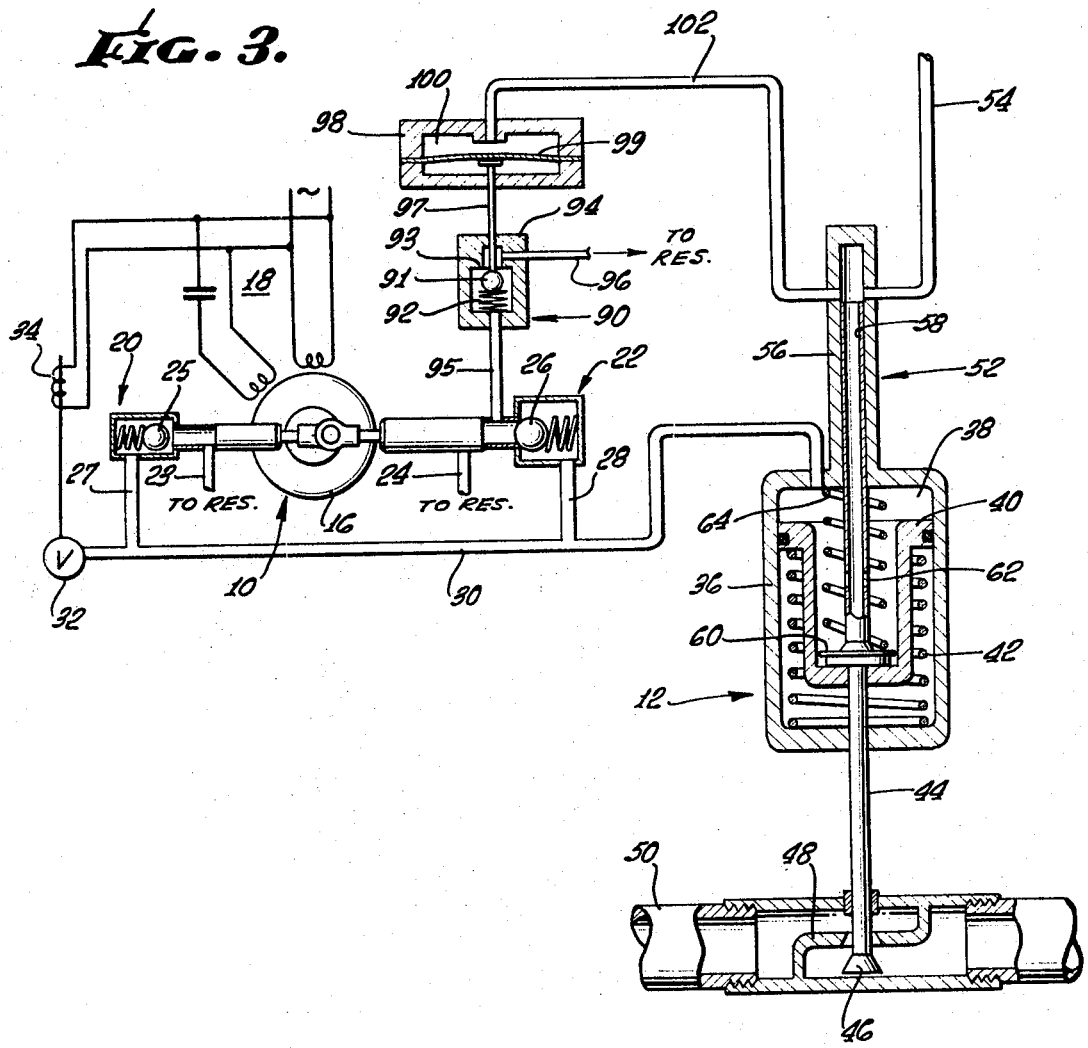
FIG. 3 is a showing of the system of FIG. 1 after the actuator piston has moved a minimum amount and after the relief valve has opened.

The pressure bleed mechanism 14 is connected to the high pressure conduit 30 through chamber 38, a minimum flow valve 52 and a conduit 54. The minimum flow valve 52 comprises a tubular extension 56 attached to the cylinder 36 and forming a valve chamber. A tubular valve element 58 slides within extension 56 and has a disc 60 attached to its lower end located in chamber 38. A coil spring 64 extends between the upper surface of the disc and the top inner wall of cylinder 36 so as to urge element 58 downwardly. An aperture 62 formed in the lower end of valve element 58 permits fluid flow upwardly through tubular element 58 into the upper end of extension 58. When valve element 58 is in the position shown in FIG. 1 blocking the port leading to conduit 54, fluid does not flow to the pressure bleed mechanism 14. As pressure in the system increases and piston 40 is forced downwardly, spring 64 forces valve element 58 to follow piston 40 so that the valve element piston 44 and fuel valve 46 each move downwardly a certain minimum amount, as shown in FIG. 2 before the minimum flow valve element 58 is moved downwardly a sufficient distance to permit fluid to flow to the pressure bleed mechanism as indicated by FIG. 3.

The upper end of conduit 54 is connected to a valve housing 66 containing a flexible diaphragm 68 urged downwardly by spring 70. When pressure within chamber 72 defined in the lower half of valve housing 66 decreases, spring 70 pivots a bellcrank valve member 74 causing member 74 to move away from valve opening 76 thereby allowing fluid to flow from conduit 54 into chamber 72. Thus, the fluid flow through valve 76 is automatically throttled and amplified by diaphragm 68 and member 74.

Chamber 72 is joined to an outlet conduit 77 leading to spill valve 78 comprising a port controlled by a flap 80 extending centrally from the pivoted, magnetizable armature member 82 which cooperates magnetically with core members 83 and 84 inside spaced coils 85 and 86 respectively. These coils are connected electrically in a bridge type circuit 87 with potentiometer resistances 88a and 88b and a suitable AC power source. The tap on resistance 88a is manually adjustable or automatically adjustable through a suitable control 89. The tap on resistance 88b is mechanically coupled by a suitable connection (not shown) to actuator piston rod 44 controlling valve 46, whereby the position of valve 46 is fed back to the spill valve.

In operation of the bleed mechanism, the manually positioned tap of resistance 88a may be calibrated to correspond with the position of valve member 46. Should the valve member 46 tend to move from this position, the position of the tap of resistance 88b tends to change also. However, this tendency to move is counteracted by an automatic change in pressure in conduits 30 and 54 and in chamber 38. Movement of the tap on resistance 88b causes movement of flap 80, thus increasing or decreasing flow through the fluid flow port in spill valve 78. This in turn varies the pressure in chamber 72 and the position of diaphragm 68, the resulting movement causing movement of valve member 74, thereby effecting the fluid flow from conduit 54 and the pressure in the conduit. This change transmitted through actuator piston 44 tends to restore the valve 46 to its initial position.

Thus, the bleed mechanism employs the force multiplying action of valve 78 to affect control of high pressures at valve 76 by pressure amplification. This pressure amplification is determined essentially by the ratio of diaphragm area multiplied by the mechanical advantage of the linkage system to the area of the nozzle comprising valve port 76. Further details of the foregoing described bleed mechanism may be obtained from U.S. Patent 3,087,471. While the force amplifying bleed mechanism may be fabricated to produce the capacity desired, it is most advantageous when operating on relatively low flow capacity since increased size increases cost.

As previously explained, it is highly desirable that the fuel valve 46 be opened a certain minimum amount in a very short duration of time. It is for this reason that two pump units 20 and 22 are provided so that their combined output is adequate to quickly pressurize chamber 38 and force the piston actuator 44 downwardly to open the fuel valve 46. However, once the valve is open this minimum amount, it is desirable that the fluid output from the pressure source be decreased so that the entire volume need not pass through the bleed mechanism 14. Consequently, there is provided in accordance with the invention a relief valve arrangement which does not function until minimum flow valve 58 has been opened. The valve 90 is illustrated as a ball valve member 91 urged by spring 92 against a valve seat 93 in housing 94. Conduit 95 connects the high pressure side of valve 90 to pump unit 22 while conduit 96 connects the low pressure side to the fluid reservoir. Rod 97 extending into a casing 98 connects ball valve 91 to a flexible diaphragm 99 extending across the casing 98 and forming a pressure chamber 100 in the upper half of the casing. A conduit 102 connects chamber 100 to tubular extension 56 and the high pressure control line when the minimum flow valve element 58 is open.

In operation, spring 92 normally holds relief valve 90 closed when the pressure in conduit 102 is low, or in other words, before the minimum flow valve 52 is open. Consequently, all of the output from pump 22 passes through duct 26 into conduit 28 to hasten the movement of piston 40 and hence the opening of fuel valve 46. Once the high pressure fluid reaches conduit 102 upon the opening of the minimum flow valve 52, the pressure in the line is sufficient to move diaphragm 99 downwardly to open relief valve 90 with the result that all of the output of pump unit 22 is positioned upstream from the outlet valve 26 controlling the fluid flow from pump unit 22 into its outlet 28. With such arrangement, the actuator is controlled solely by the output from pump unit 20 after the minimum flow valve 52 has been opened. Although pump unit 22 continues to operate, its output is ducted directly to the reservoir through relief valve 90. As a side benefit, the resulting output from pump unit 20 is received in a pulsating form with the result that it serves to keep the fluid passages free of obstructions.

The speed of operation of the actuator unit is largely determined by the pressure output from the pressure source which in turn can be varied as desired by designing pump unit 22 to provide the preferred results. In the arrangement illustrated pump unit 22 is shown somewhat larger than unit 20 to indicate that the corresponding capacities of the units are similarly related.

Figure 4:
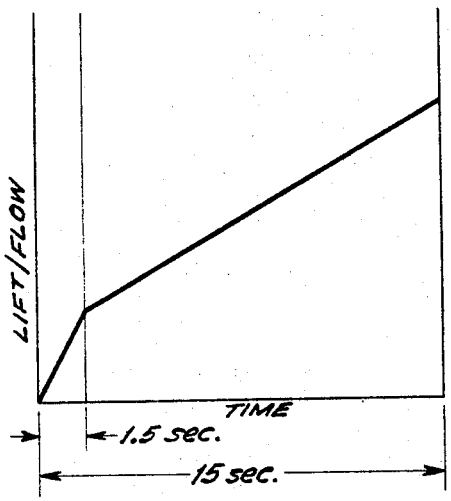
FIG. 4 is a graph illustrating the operating speed of the system.

As an example of the operational times involved, refer to the graph shown in FIGURE 4 wherein it can be seen that the flow rate or valve lift rate changes very sharply at the 1.5 seconds point. This change point corresponds to the position at which the minimum flow valve 52 opens and relief valve 90 opens. In other words, then the pump motor is first energized, the entire output from both pumps operates to quickly open the fuel valve a fixed minimum amount in 1.5 seconds. After that time with the relief valve 90 open, the flow rate through valve 46 increases at a more gradual rate until after 15 seconds have elasped, the valve has opened to its full flow position. Since the minimum flow position corresponds to that flow which is necessary to safely support combustion, flow rates below that position constitute a potentially dangerous condition. Therefore, with the control system of the invention, it can be seen that such condition is limited in duration to only 1.5 seconds which is more than adequate to meet code requirements.

Moreover, with the arrangement illustrated, conventional or standard components already designed such as the bleed mechanism may be employed without requiring further refining to fit the exact flow capacities of the system. Instead, it is only necessary to select pump unit 22 to provide the speed desired. Further, the system is more easily controlled when the flow rates through the bleed mechanism are kept to reduced levels. Finally, in countries not having such severe code requirements with regard to the speed of operation of the valve, the same system can be used with a different pump and without the relief valve.

It should be noted that the relief valve arrangement provided is not dependent upon precise calibration or operation of a given spring as in a conventional relief valve. That is, diaphragm 99 and spring 92 are selected such that relief valve 90 is immediately opened upon the application of sufficient pressure to open the actuator to the minimum flow position. Following that, the relief valve 90 remains open so long as the minimum flow valve is open and is independent of any additional pressure increases in the control line 30 and 54. With such construction, the viscosity of the control fluid does not affect operation either.

While only a particular embodiment of the present invention has been shown and described, it will be obvious to those skilled in the art that various changes and modifications may be made without departing from this invention in its broader aspects. Therefore it is intended that the appended claims cover all such changes and modifications as fall within the true spirit and scope of this invention.

What is claimed is:

1. A hydraulic actuator and control system therefor comprising:
   a fluid pressure source;
   a conduit means connected to the output of said source;
   a device connected to said conduit means operated by fluid pressure developed by said source;
   means connected to said conduit means for bleeding the pressure in said conduit means to control the pressure applied to said device;
   means blocking said bleeding means until said device has been actuated a minimum amount by the pressure applied to the device; and
   a relief valve connected to said source for bypassing from said device a portion of the output from said source after said device has moved said minimum amount, said relief valve being controlled by the pressure in said conduit means between said blocking means and said bleed means.

2. The system of claim 1 including a diaphragm subjected to the pressure in said conduit between said blocking means and said bleed means and connected to control movement of said relief valve in a manner to open said relief valve when said device has moved said minimum amount and said blocking means permits fluid flow therethrough.

3. The system of claim 2 wherein said source comprises an electric motor driving a pair of pump units each including a rod connected to said diaphragm and a movable valve element of said relief valve.

4. The system of claim 1 wherein said device is an actuator piston slidably mounted in a cylinder and said blocking means is a valve controlled by operation of the actuator piston.

5. The system of claim 1 in which said device includes a cylinder and a piston slidably mounted in the cylinder; said piston and cylinder defining a chamber connected to said conduit means; said blocking means includes a valve chamber and a valve member movably mounted in said valve chamber and a connection from said valve chamber to said bleeding means; said valve member being connected to be responsive to the position of said piston to control fluid flow through said connection whereby the position of said piston determines the operability of said bleeding means.

6. The system of claim 1 wherein said fluid pressure source includes a pump having two high pressure outlets and said relief valve is in communication with one of said outlets.

7. The system of claim 6 wherein said one outlet is provided with an outlet valve and said relief valve is connected upstream from said outlet valve whereby all output for said one outlet is bypassed directly to said reservoir when said relief valve is open.

8. The system of claim 6 wherein said one outlet has a capacity substantially greater than the capacity of the other outlet whereby said device is very quickly moved said minimum amount and after which the output from the other outlet of said source is adequate to operate said device.

9. The system of claim 1 wherein said source comprises an electric motor driving a pair of pump units each including a piston, a cylinder, and an outlet valve, with one of said units having a considerably greater output than the other of said units, and said relief valve is connected to the larger of said pump units upstream of its outlet valve so that the entire output of said larger unit is bypassed to said reservoir when said relief valve is opened.

References Cited

UNITED STATES PATENTS

| | | | |
|---|---|---|---|
| 2,013,754 | 9/1935 | Hanney | 91—426 |
| 2,314,398 | 3/1943 | Hoch | 91—27 |
| 2,129,083 | 9/1938 | Carter et al. | 91—404 |
| 2,769,429 | 11/1956 | Lencioni | 91—400 |
| 2,994,303 | 8/1961 | Robra et al. | 91—27 |
| 2,365,748 | 12/1944 | Curtis | 91—27 |
| 2,810,930 | 10/1957 | MacDonald et al. | 91—400 |
| 3,087,470 | 4/1963 | Beard et al. | 91—47 |
| 3,087,471 | 4/1963 | Ray | 91—47 |

MARTIN P. SCHWADRON, *Primary Examiner.*

B. L. ADAMS, *Assistant Examiner.*